United States Patent

Drieskens et al.

[11] Patent Number: 5,807,911
[45] Date of Patent: Sep. 15, 1998

[54] BITUMINOUS SELF-ADHESIVE COMPOSITIONS FOR COLD APPLICATIONS

[75] Inventors: Bruno Drieskens, Brussels; Bernard Haveaux, Nivelles, both of Belgium

[73] Assignee: Fina Research, S.A., Feluy, Belgium

[21] Appl. No.: 734,089

[22] Filed: Aug. 21, 1996

Related U.S. Application Data

[63] Continuation of Ser. No. 210,202, Mar. 17, 1994, abandoned.

[30] Foreign Application Priority Data

Mar. 24, 1993 [BE] Belgium ................. 09300289

[51] Int. Cl.⁶ ........................................ C08L 95/00
[52] U.S. Cl. ................................................... 524/68
[58] Field of Search .................................... 524/68

[56] References Cited

U.S. PATENT DOCUMENTS

| | | | |
|---|---|---|---|
| 4,196,115 | 4/1980 | Bresson | 524/68 |
| 4,464,427 | 8/1984 | Barlow | 524/68 |
| 4,738,884 | 4/1988 | Algrim et al. | 524/68 |

*Primary Examiner*—Peter A. Szekely
*Attorney, Agent, or Firm*—Michael J. Caddell; M. Norwood Cheairs

[57] ABSTRACT

Bituminous compositions modified with self-adhesive cold-application polymers generally used for manufacturing of watertight panels, said compositions comprising a mixture containing a rubbery styrene-diene polymeric mixture, one or more tackifying resins, and bitumen.

9 Claims, No Drawings

BITUMINOUS SELF-ADHESIVE COMPOSITIONS FOR COLD APPLICATIONS

CROSS REFERENCE TO RELATED APPLICATIONS

This application claims priority under a prior copending application filed in Belgium on Mar. 24, 1993, application Ser. No. 09/300,289, which application is incorporated herein by reference, in its entirety. This application is a continuation of parent application, Ser. No. 08/210,202, filed Mar. 17, 1994, now abondoned.

BACKGROUND OF THE INVENTION

The present invention relates to self-adhesive bituminous compositions modified with polymers and generally used for manufacturing watertight roofing shingles. More particularly, the present invention relates to bituminous self-adhesive compositions having improved properties particularly advantageous for cold applications and offering rapid adhesion, resistance to peeling, and desirable ring-and-ball temperature (RBT).

Also, the present invention involves watertight shingles having at least one layer of the inventive bituminous composition which composition utilizes bitumen, polymers, and mineral loads.

In some instances they might also contain other bituminous layers or modified bitumen. The bituminous compositions disclosed herein can also contain mineral or synthetic fibres and thixotropic agents such as silica.

It is well known to use bituminous compositions for manufacturing watertight shingles generally for roof covering. Traditional systems for making these products involve a process of warming up bitumen or flame soldering. It is obvious that this type of technique is dangerous considering the risk of fire caused by the utilization of a torch and other similar equipment.

One solution to eliminate the fire element is to use glues to avoid the fire danger, but such glues generally contain solvents that are not desirable from an environmental point of view. The result is also not successful each and every time.

Self-adhesive compositions comprising one linear styrene-butadiene-styrene tri-block copolymer and styrene-butadiene di-block copolymer are also known; however, these compositions require the use of mineral oil during application, and their properties are not acceptable from RBT and flow resistance points of view. The presence of oil can also increase the exudation risk.

There is therefore a need for improved bituminous self-adhesive cold-application compositions that present the following improved properties:

rapid adhesion resistance to peeling high ring-and-ball temperature good obsolescence resistance good elastic properties at low temperatures.

A bituminous self-adhesive cold-application composition responding to the criteria mentioned above is then the object of the present invention.

SUMMARY OF THE INVENTION

The present invention provides a bituminous self-adhesive cold-application composition that comprises a mixture of bitumen, a mixture of different thermoplastic polymers and tackifying resins, mineral loads, and optionally, fibres and/or thixotropic agents.

The present invention also teaches watertight roofing panels having at least one bituminous self-adhesive cold-application layer of the inventive composition.

The present invention also discloses a process for manufacturing the watertight panels.

DESCRIPTION OF THE PREFERRED EMBODIMENTS

Bituminous self-adhesive cold compositions of the present invention are characterized in that they comprise a mixture consisting of:

5 to 25% of a mixture of rubbery polymers of styrene-diene type comprising at least:

(a) linear styrene-butadiene block copolymer;

(b) linear and/or radial styrene-isoprene block copolymer; and (c) styrene-diene di-block copolymer, preferably of statistical interlinking ("statistical intermediate sequence");

0 to 25% of one or more tackifying resins; and 5 to 95% bitumen.

The bituminous composition of this invention may also contain the usual mineral loads, including mineral or synthetic fibres, as well as thixotropic agents. These loads are generally used at the rate of about 0 to 40%, based on the weight of the bituminous composition.

It has now been found unexpectedly that such a bituminous self-adhesive cold-application composition meets not only all required properties from the point of view of cold adhesion, obsolescence, ring-and-ball temperature and cold elasticity, but also that the properties of the composition remain satisfactory even when one or more polymers are added. Furthermore, generally improved properties are obtained when at least three polymers are present. Thus, the bituminous composition of the invention comprises, in addition to tackifying resins and bitumen that will be described later, a mixture of different polymers selected from (A), (B) and (C) described in detail below:

(A) Linear styrene-butadiene block copolymer with a styrene content of approximately 28 to 77 weight percent and a weight-average molecular weight between ($M_w$) 70,000 and 160,000. The copolymer (A) preferably represents between 45 and 85 weight percent of the total polymeric mixture and more preferably between 65 and 75 weight percent of the polymeric mixture.

One example of an appropriate linear copolymer would be coupled styrene-butadiene copolymers of a general formula S-B-(c)-B-S where (c) represents a coupling agent. Styrene-butadiene-styrene copolymers without coupling agents, can also be used.

(B) Linear and/or radial styrene-isoprene in which the styrene component represents from 10 to 40 weight percent and preferably from 10 to 20 weight percent and in which the total molecular weight is between 60,000 and 400,000, preferably between 100,000 and 150,000.

Examples of appropriate linear and radial copolymers would be coupled styrene-isoprene and styrene-isoprene-styrene. The copolymer (B) preferably represents between 5 and 45 weight percent of the polymeric mixture and more preferably between 5 and 25 weight percent of the polymeric mixture.

(C) Styrene-diene di-block copolymer, preferably styrene-butadiene in which the styrene portion represents from about 15 to 45 weight percent and preferably from about 20 to 35 weight percent and whose total molecular weight is between 50,000 and 150,000, and preferably between 50,000 and 100,000. Preferably, copolymer (C) used in the present invention is of the type utilizing statistical interlinking which means that it contains one styrene block and one styrene-butadiene block in a statistical distribution. Generally, the styrene block represents 70% of the total styrene. Copolymer (C) is used simultaneously as a compatibility agent and an adhesive. Copolymer (C) preferably represents approximately 10 to 40 weight percent of the polymeric mixture and more preferably from 20 to 40 weight percent.

Styrene-conjugated diene block copolymers appropriate for the present invention also include their partially and totally hydrogenated derivatives.

The bituminous composition of the invention may also contain one or more tackifying resins at the rate of from about 0 to about 25 weight percent of the total bituminous composition. Higher quantities can be used but to the detriment of some properties. The role of tackifying resins is well known in the sector of adhesives.

The tackifying resins are well known conventionally and are more particularly described in U.S. Pat. No. 4,738,884, which is incorporated herein by reference in its entirety.

The bitumen useful in the present invention can be direct distillation bitumen or oxidized bitumen, natural bitumen, precipitation bitumen and others. It is also clear that different types of bitumen can be mixed as well as modified by addition of one or more oils.

According to the present invention, it is desirable to use a bitumen having a penetration index at 25° C., of less than 800 (0.1 mm) (ASTM D 5–73 norm), and preferably between 30 and 400. Direct distillation bitumen is preferable, with a preference for one which has a penetration index between 80 and 250.

It has been unexpectedly found that the combination of the three copolymers (A), (B) and (C) allows the preparation of bituminous compositions that have improved properties, especially cold adhesion, at the same time keeping good ring-and-ball temperature (RBT) and elongation and elasticity properties when cold.

In fact, it was noted that when one or more polymers (A), (B) and (C) were not present in the formulation, the obtained properties were not as good.

It has also been found that according to a particular method of execution of the present invention it is possible to introduce advantageously one radial styrene-butadiene block copolymer into the rubbery polymers mixture.

The block copolymers (A), (B) and (C) are well known in the polymer field. They are generally obtained during anionic polymerization of monomer feeds in a solvent in the presence of an alkylmetallic catalyst such as alkyllithium. They can be prepared during successive polymerization of styrene and butadiene or isoprene when linear block copolymers are involved. In case radial structure block copolymers are involved, copolymers able to exhibit at least three branches are utilized, with every branch having at least one polystyrene block and one polybutadiene or polyisoprene block. This method is described in U.S. Pat. No. 3,281,383, which is incorporated by reference herein in its entirety. The above described copolymers can comprise statistical parts and be within the scope of the present invention. Copolymers do not have to be necessarily of a symmetric composition.

The present invention also discloses watertight roofing panels which comprise at least one cold-application self-adhesive layer made according to the above described bituminous composition and one or more optional bituminous layers modified with polymers and possibly with added mineral loads. However, it is entirely unexpected and it is a great advantage of the inventive compositions that they can constitute the entire watertight panelling, even though it was necessary to use other layers in conventional roofing compositions to guarantee required thermo-mechanical A properties (e.g. RBT) and for providing a non-adhesive layer comprising bitumen modified with a rubbery polymer, and mineral loads and other thixotropic agents. Thus, the present invention eliminates this need for additional non-adhesive layers of bitumen, rubbery polymer modified bitumen, and bitumen loaded with minerals and thixotropic agents.

The compositions of the present invention present a great advantage over conventional techniques since they not only exhibit improved properties but can also be used in the form of sole composition sheets.

The bituminous self-adhesive cold-application compositions of the present invention can also be used for other purposes such as mastics, emulsions or other watertight sealants.

The invention is further described with the assistance of the examples below which are given for purposes of illustration and not limitation. All molecular weights referred to throughout this disclosure are weight-average molecular weights ($M_w$)

EXAMPLES

The following compositions were prepared with a laboratory mixer having a high coefficient of shearing (SILVERSON type). Staple bitumen was heated to a temperature of 180° C. in a thermostatic-controlled oil bath. Different rubbery components were introduced into the bitumen together with one or more tackifying resins. Introduction of the tackifying resins after complete dispersion of the rubber was also tested but it apparently had no observable influence on the results. Dynamic viscosity was measured with a rotational conical and planar system from HAAKE company. The indicated viscosity corresponds to a coefficient of shearing of 100 s-1.

For adhesion tests, the bituminous composition was dissolved in an equal quantity of toluene to obtain a paste of good consistency which was applied with a scraper to a polyester film, with a constant thickness of the paste. This film had previously been treated with toluene to remove the fat content. Afterward, toluene was evaporated in an oven at 50° C. for 1 hour. The result was a polyester film covered with a homogeneous layer of constant thickness (30 microns) of the bituminous composition.

Using a conventional adhesive testing method, 25 mm wide strips of the composition on the polyester film were cut and applied under a constant force of the weight of a heavy roller, onto a stainless steel support plate which had had all fat cleaned off by toluene.

This method of preparation of samples for the peeling test is very important because it guarantees good uniformity and constant thickness of bituminous composition as well as a constant application force.

Ad An adhered sample on the stainless steel plate was then allowed to cure for 24 hours at 23° C. before being tested for peeling with a conventional traction machine having a traction speed of 300 mm/min.

| Examples | RBT (ASTM D36–66) (°C.) | Peeling resistance (N/25 mm) | POLYKEN TACK (ASTM D2979–88) (g) |
|---|---|---|---|
| I. 75% NYNAS B 200<br>5% linear SBS<br>$M_w$ = 120,000;<br>TS = 30%<br>10% linear SIS<br>$M_w$ = 135,000;<br>TS = 15%<br>10% HERCOTAC 205 | 83 | 20 | 650 |
| II. 75% NYNAS B 200<br>10% linear SBS<br>$M_w$ = 120,000;<br>TS = 30%<br>3% di-block SB<br>$M_w$ = 75,000;<br>TS = 25%<br>% styrene block = 17%<br>2% linear SIS<br>$M_w$ = 135,000;<br>TS = 15%<br>10% HERCOTAC 205 | 92 | 23 | 750 |

| Ex. | PEN at 25° C. (ASTM D5–65) (0.1 mm) | Dynamic viscosity at 180° C. (mPa · s) | Elongation factor to breaking (ASTM D-412) (%) | Cold folding* (DIN 52123) (°C.) |
|---|---|---|---|---|
| I. | 65 | 1600 | 2600 | −20 |
| II. | 53 | 2250 | 3100 | −25 |

*on molded by compression test tubes
HERCOTAC 205 is a commercially available resin offered by Hercules Corporation, U.S.A.
NYNAS B 200 is a commercially available bitumen sold by NYNAS Company, with a penetration index of around 200.
TS = Total styrene content, percent by weight.

The RBT vales, Peeling resistance and Tack values of the two examples above exceed the values which can be obtained from conventional adhesives such as hydrocarbure types and resin derivatives.

We claim:

1. A bituminous cold-application self-adhesive composition characterized in comprising a mixture of:
   5 to 25% of a styrene-diene rubbery polymer mixture that comprises:
   a) one linear styrene-butadiene block copolymer;
   b) at least one styrene-isoprene block copolymer selected from the group consisting of linear and radial copolymers; and;
   c) a styrene-butadiene di-block copolymer in which the styrene portion represents from 15 to 45 weight percent, with a total weight-average molecular weight of between 50,000 and 150,000; and wherein said di-block copolymer is of the type having statistical interlinking, containing one styrene block and one styrene-butadiene block in a statistical distribution;
   0 to 25% of at least one tackifying resin; and,
   5 to 95% bitumen.

2. The composition of claim 1 characterized in that copolymer (A) consists of a linear styrene-butadiene block copolymer having a styrene content of from 28 to 77 weight percent and a weight-average molecular weight of between 70,000 and 160,000.

3. The composition of claim 1 characterized in that copolymer (A) represents between 45 and 85 weight percent of the rubbery polymer mixture.

4. The composition of claim 1 characterized in that copolymer (B) consists of a styrene-isoprene block copolymer in which the styrene portion represents from 10 to 40 weight percent and in which the total weight average molecular weight is between 60,000 and 400,000.

5. The composition of claim 4 characterized in that copolymer (B) represents between 5 and 45 weight percent of the rubbery polymer mixture.

6. The composition of claim 1 characterized in that copolymer (C) comprises a styrene-butadiene di-block copolymer, in which the styrene portion represents from 15 to 45 weight percent and whose total weight average molecular weight is between 50,000 and 150,000.

7. The composition of claim 1 characterized in that the copolymer (C) represents between 10 and 40 weight percent of the rubbery polymer mixture.

8. The composition of claim 1 characterized in that the copolymer (C) is a radial styrene-butadiene block copolymer.

9. The composition of claim 2 wherein copolymer (A) comprises between 55 and 75 weight percent of the rubbery polymer mixture, copolymer (B) comprises between 5 and 25 weight percent of the rubbery mixture, and copolymer (C) comprises between 20 and 40 weight percent of the rubbery polymer mixture.

* * * * *